Feb. 11, 1958  W. L. DAVIS  2,823,324
STEP-BY-STEP MOTOR
Filed Oct. 19, 1954  3 Sheets-Sheet 1

INVENTOR.
William L. Davis
BY Alois W Graf
Attorney

Feb. 11, 1958 W. L. DAVIS 2,823,324
STEP-BY-STEP MOTOR
Filed Oct. 19, 1954 3 Sheets-Sheet 2
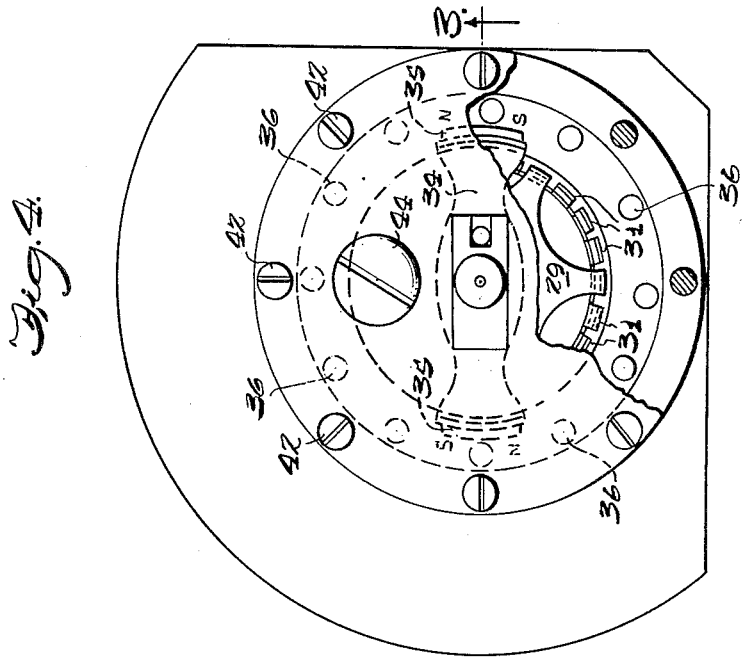
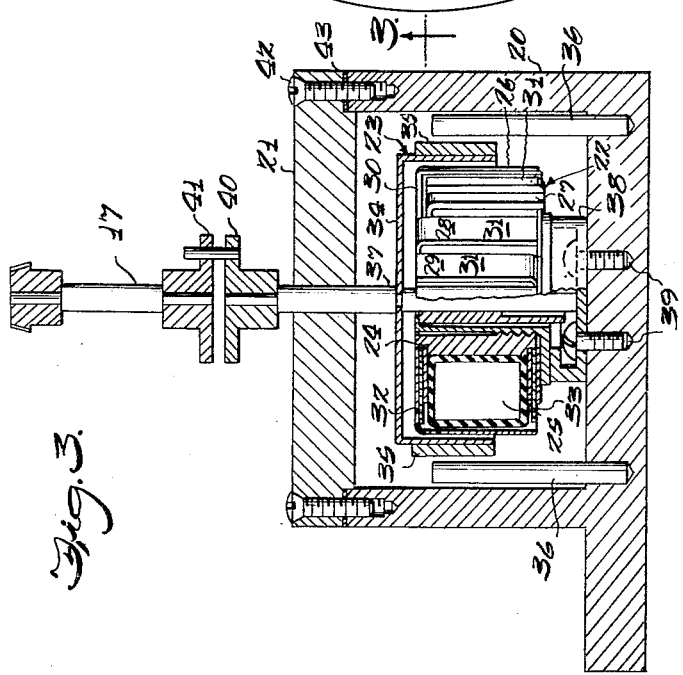
INVENTOR.
William L. Davis
BY Alois W. Graf
Attorney

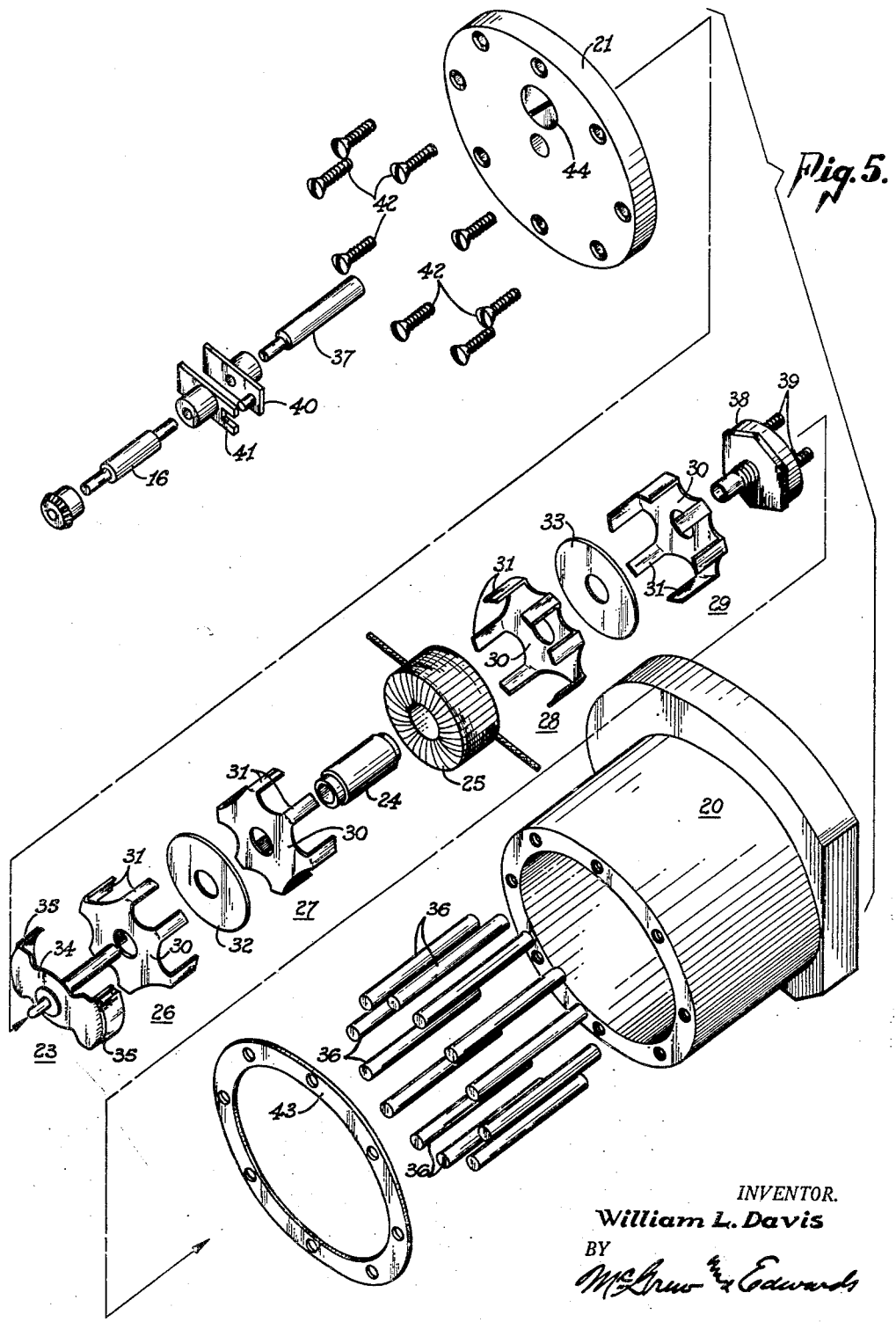

United States Patent Office 2,823,324
Patented Feb. 11, 1958

2,823,324
STEP-BY-STEP MOTOR

William L. Davis, Denver, Colo., assignor, by mesne assignments, to Hamilton Watch Company, Lancaster, Pa., a corporation of Pennsylvania Application October 19, 1954, Serial No. 463,277

5 Claims. (Cl. 310—49)

This invention relates to stepping motors and particularly to an improved pulse-responsive stepping motor.

It is an object of this invention to provide an improved pulse responsive stepping motor.

Other objects and advantages of the invention will be apparent during the course of the following description when read in connection with the accompanying drawings, wherein:

Figure 3 is a cross-sectional view of the pulse motor of the power interchange register taken at section 3—3 of Figure 4;

Figure 4 is a plan view, partially broken away, of the pulse motor; and

Figure 5 is an exploded perspective view of the pulse motor.

Figure 1:
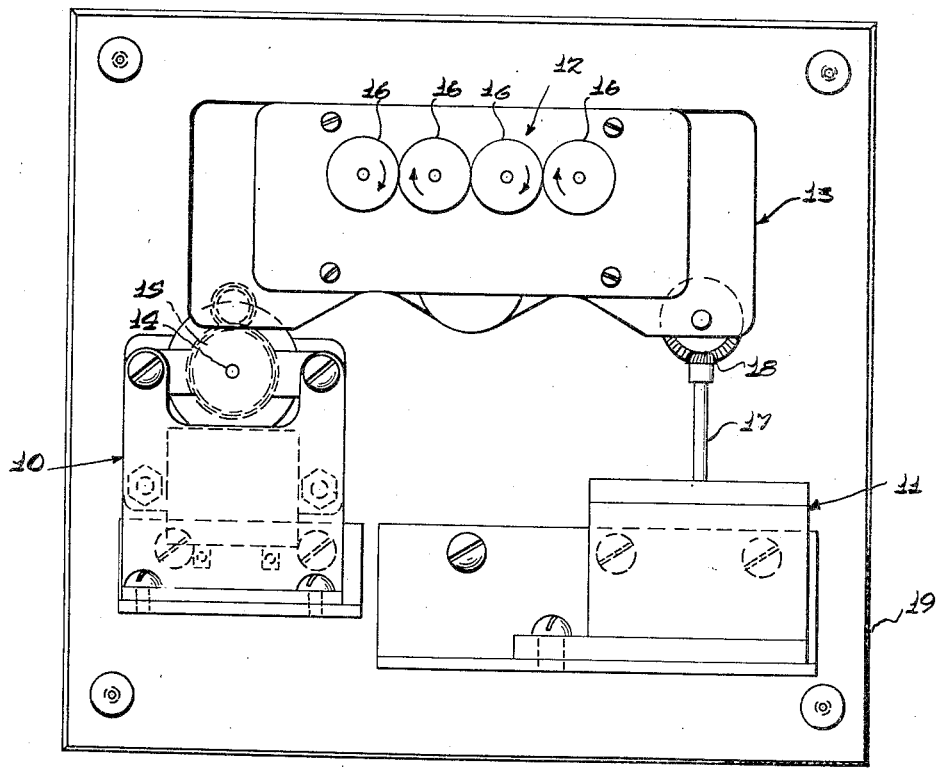
Figure 1 is a front view of a power interchange register provided with a pulse motor embodying the invention.

Referring to Figure 1 of the drawing there is shown a power interchange register wherein a synchronous motor 10 and a pulse motor 11 which embodies the invention drive a power indicator 12 through differential gearing contained within a housing 13. The synchronous motor 10 may be any 115 volt A. C. 60 cycle motor of well known design, whose shaft 14 is coupled through a gear 15 to the first input to the differential drive contained in housing 13. The power indicator 12 consists of indicator dials 16 which are coupled to the differential gearing contained in housing 13 in well known manner. The pulse motor 11 is coupled through a shaft 17 to the second input to the differential gearing through a beveled gear 18 contained in housing 13. The motors 10, 11 and differential gearing housing 13 are mounted on panel 19 by means of screws and brackets or the like.

Referring now to Figures 3, 4 and 5 the pulse motor 11 is contained within a case 20 having a cover 21. The pulse motor 11 consists of a stator field member 22 and a rotor member 23. The stator member comprises a hollow or tubular magnetizable core 24 surrounded by a single-phase coil or winding 25, said core 24 having magnetizable field-casing means at each end thereof. In the preferred form of construction which is shown in the drawings, the magnetizable field-casing means comprise four substantially identical field-casing sections 26, 27, 28 and 29 of magnetizable material, each field-casing section comprising a magnetizable disk 30 and a plurality of magnetizable teeth 31 forming, in the preferred embodiment, twelve pairs of pole pieces disposed at right angles to said disk and energized to create north and south poles in adjacent pole tips.

Two of said magnetizable disks 30 are disposed at each end of the core, with copper or other lag disks 32 and 33, respectively, disposed therebetween, at the respective ends of the core 24; that is, the disks are arranged in the order 26, 32, 27 at one end of the core and in the order 28, 33, 29 at the other end of the core.

The magnetizable field-casing sections 26, 27, 28 and 29 are assembled with their teeth projecting inwardly over the coil 25, in a cylindrical multi-polar field formation around said coil, with the teeth progressing around the circumference in the order: (1) one tooth $31^{26}$ from the inner magnetizable field-casing section 26 at one end of the core 24, (2) one tooth $31^{27}$ from the outer magnetizable field-casing section 27 at the same end of the core 24, (3) one tooth $31^{28}$ from the inner magnetizable field-casing section 28 at the other end of the core 24, (4) one tooth $31^{29}$ from the outer magnetizable field-casing section 29 at said other end of the core 24, and so around the circumference of the cylinder.

The rotor member 23 comprises a light-weight supporting member 34 on which are mounted two permanent magnets 35. Around the outside of this rotor and stator structure, leaving just enough space for the free movement of the rotor, are placed an additional twelve magnetic structures 36 which may be made of round cold rolled steel. These magnetic pole members 36 are displaced slightly in the clockwise direction of rotation with respect to the magnetic poles 31 of the motor itself. This causes the pole pieces 36 to shade the rotor magnets 35 when these are aligned with the pole pieces 36. The rotor 23 is mounted on a shaft 37 which journals in a base 38 and the cover 21. The base 38 is rigidly mounted to the pulse motor case 20 with screws 39. The shaft 37 is directly coupled through two plates 40, 41 to shaft 17. The cover 21 is sealed to the case 20 by tightening screws 42. This compresses a gasket 43 between cover 21 and case 20. The pulse motor housing is filled with appropriate damping fluid, such as silicone oil, through a hole in the cover which is closed by a filler cap 44.

Figure 2:
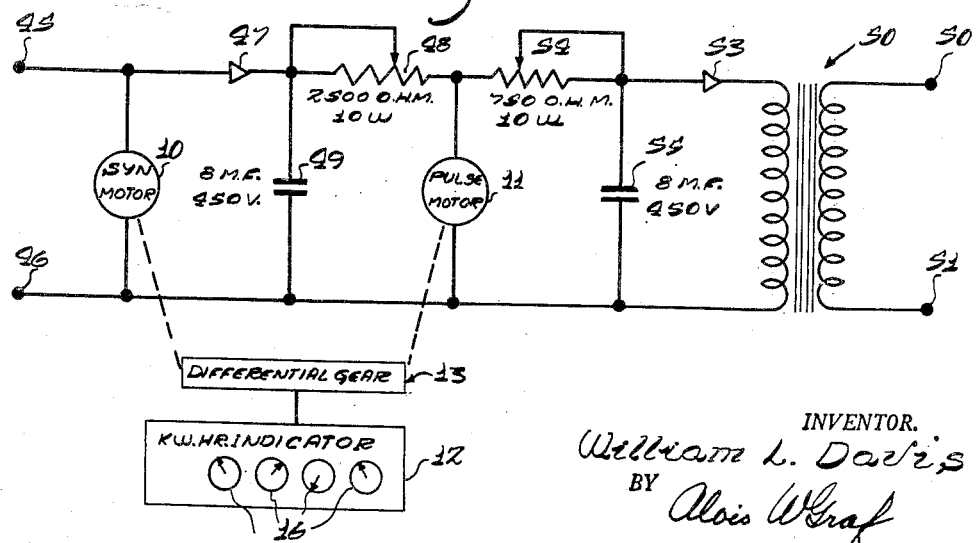
Figure 2 is a circuit diagram of the power interchange register showing the motor connected therein.

Referring now to Figure 2, power is applied to the synchronous motor 10 through two terminals 45 and 46. One power input to the pulse motor is supplied from two terminals 45 and 46 through a rectifier 47 and an adjustable resistor 48. A capacitor 49 is applied for filter purposes across the adjustable resistor 48 and pulse motor 11. The pulse voltage input to the pulse motor 11 is applied from two other terminals 50, 51 through a transformer 52, a rectifier 53 and an adjustable resistor 54. A capacitor 55 is placed for filter purposes across the adjustable resistor 54 and the pulse motor 11. The pulse motor 11 winding, energized through the two adjustable resistors 48 and 54 with a substantially D. C. current, is the stator winding 25 described earlier.

With no pulse voltage input to the transformer 52 the only D. C. voltage applied to the pulse motor 11 is obtained from the first power source terminals 45, 46. This will cause the rotor 13 to align itself with the six sets of magnetic fields set up in the stator 22 in a position slightly displaced from the exact center of the magnetic field in the stator, and this displacement is due to the magnetic flux seeking the best magnetic path through the rotor pole and the displaced outside magnetic pole pieces 36. The rotor 23 will remain in this position as long as no pulse is received from the pulse terminals 50, 51. When a pulse is received at the pulse terminals 50, 51, it is rectified into D. C. voltage through the rectifier 53 and filter 55 which is applied to the pulse motor through variable resistor 54. Due to the circuit parameters and the proper adjustment of variable resistors 48 and 54, the resulting current through the motor due to both D. C. voltages will be of equal magnitude but of opposite polarity. This reverse in current causes the magnetic field to reverse, and in turn causes the permanent rotor magnets to seek the nearest opposite pole. The closest pole of opposite polarity in this case, due to the slight displacement present in steady state from the exact center of the magnetic field in the stator, is in the clockwise direction of rotation. Thus the rotor 23 moves clockwise one pole and remains in that position due to the steady magnetic field produced by the pulse during the pulse duration. When the pulse voltage drops to zero, the pulse current in the motor also drops to zero, and the steady state D. C. current from the first power source terminals 45 and 46 is the only current present. This again reverses the magnetic field, and thus the rotor moves clockwise one additional pole. In operation, with a series of pulses applied, the rotor will then move continuously in a clockwise direction, moving one pole at the beginning of each pulse and another pole at the end of each pulse, the speed of rotation depending upon the number of pulses per unit time. Due to acceleration of the rotor when the magnetic field reverses, the rotor has a tendency to overshoot. Any overshoot or oscillation is damped out by the damping fluid in which the rotor is immersed.

In operation of the power interchange register, the synchronous motor 10 drives the register through the differential gearing in a clockwise direction at a continuous rate. If no pulses are received at the pulse input terminals 50, 51, the synchronous motor drive shaft 17 will cause the indicator to move, in the preferred embodiment, at a counting rate of 120 pulses per minute. The pulse motor 11 when operating causes the register 10, through the differential gearing, to move in a clockwise direction at a rate determined by the pulse rate applied to the pulse motor. The pulse motor will register, in the preferred embodiment, for any pulse rate between zero and 240 pulses per minute. Therefore, if the synchronous motor is running and the pulse rate to the pulse motor is 120 pulses per minute, the net count indicated on the register is zero. If the pulse motor is operated at a rate of 200 pulses per minute, the register will indicate a net value of 80 pulses per minute positive, or 4800 pulses per hour. If the pulse motor is operated at a rate of 40 pulses per minute, the net count will be 80, except that this count will be in the negative direction. The indicated register pulse rate is a direct function of the power exchanged at the remote interchange point. Accordingly the indicator dials may be directly calibrated in kilowatt hours or any preferred unit of power.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

I claim as my invention:

1. A pulse motor comprising a coil surrounded by a plurality of field casing members for producing a multipolar field formation, a plurality of magnetic members spaced from said field casing members to shade the poles of said field formation, and a rotor having two arms each provided with a permanent magnet providing leading and trailing pole tips of opposite polarity and arranged to move between said field casing members and said magnetic pole shading members.

2. A pulse motor comprising a coil surrounded by a plurality of field casing members for producing a multipolar field formation, a plurality of magnetic members spaced from said field casing members to shade the poles of said field formation, and a rotor having two arms each provided with a permanent magnet providing leading and trailing pole tips of opposite polarity and arranged to move between said field casing members and said magnetic pole shading members, said rotor advancing to an adjacent pair of pole pieces when the magnetic field reverses.

3. A pulse motor comprising a coil surrounded by a plurality of magnetizable pole pieces for producing a cylindrical multipolar field formation, a plurality of magnetic members arranged in a circle and spaced from said magnetizable pole pieces to shade the poles of said field formation, and a rotor having two arms each provided with a cylindrical extension carrying a permanent magnet providing leading and trailing pole tips of opposite polarity and arranged to move between said magnetizable pole pieces and said magnetic pole shading members.

4. A pulse motor comprising a coil surrounded by a plurality of magnetizable pole pieces for producing a cylindrical multipolar field formation, a plurality of magnetic members arranged in a circle and spaced from said magnetizable pole pieces to shade the poles of said field formation, and a rotor having two arms each provided with a cylindrical extension carrying a permanent magnet providing leading and trailing pole tips of opposite polarity and arranged to move between said magnetizable pole pieces and said magnetic pole shading members, said motor being enclosed in a casing filled with a damping fluid.

5. A pulse motor comprising a coil surrounded by a plurality of magnetizable pole pieces for producing a cylindrical multipolar field formation, a plurality of magnetic members arranged in a circle and spaced from one pole of each pair of magnetizable pole pieces to shade the magnetic poles of said field formation, and a rotor having two arms each provided at the end thereof with a cylindrical sector carrying a permanent magnet providing leading and trailing pole tips of opposite polarity and arranged to move between said magnetizable pole pieces and said magnetic pole shading members to advance said rotor to an adjacent pair of pole pieces whenever the magnetic field reverses in said coil, and connections for supplying rectified alternating current, and rectified pulse current to said coil of said motor.

References Cited in the file of this patent

UNITED STATES PATENTS

| | | |
|---|---|---|
| 1,628,450 | Blanchard | May 10, 1927 |
| 1,933,590 | Holtz et al. | Nov. 7, 1933 |
| 1,967,782 | Putnam | July 24, 1934 |
| 2,140,365 | Lenehan | Dec. 13, 1938 |
| 2,389,275 | Rayner et al. | Nov. 20, 1945 |

FOREIGN PATENTS

| | | |
|---|---|---|
| 203,824 | Switzerland | Sept. 16, 1939 |